United States Patent [19]
Nedbal

[11] Patent Number: 4,854,877
[45] Date of Patent: Aug. 8, 1989

[54] METHOD OF PSYCHOLOGICALLY REINFORCING A DIETING REGIMEN

[76] Inventor: Thomas F. Nedbal, 43W241 Hazelwood Trail, St. Charles, Ill. 60174

[21] Appl. No.: 212,178

[22] Filed: Jun. 27, 1988

[51] Int. Cl.[4] .............................................. G09B 19/00
[52] U.S. Cl. .................................................... 434/236
[58] Field of Search ...................... 434/236, 238, 127; 131/270; 206/830, 606, 602.1; 40/306, 307, 310, 311, 312, 313; 312/236

[56] References Cited

U.S. PATENT DOCUMENTS

| | | | |
|---|---|---|---|
| 958,887 | 5/1910 | Parmele | 402/307 X |
| 4,399,666 | 8/1983 | Sakutori | 312/236 X |

*Primary Examiner*—William H. Grieb
*Attorney, Agent, or Firm*—Wood, Dalton, Phillips Mason & Rowe

[57] ABSTRACT

A method of psychologically reinforcing a dieting regimen, which method consists of the steps of providing a container defining a storage space with an opening for gaining access to the storage space, placing edible materials in the storage space, placing a movable closure over the container access opening in a closed position to prohibit access to the edible materials within the storage space through the container opening, with the closure being movable between the closed position and an open position wherein access can be gained through the container opening to the edible material in the storage space, and providing structure for clearly indicating that the closure has been moved from its closed position to its open position.

9 Claims, 1 Drawing Sheet

METHOD OF PSYCHOLOGICALLY REINFORCING A DIETING REGIMEN

BACKGROUND OF THE INVENTION

1. Field of the Invention

This invention relates to dieting and, more particularly, to a method of visibly demonstrating to a dieter that resolve has been broken upon the dieter repositioning a closure associated with a container to thereby gain access to edible materials within the container.

2. Background of the Invention

Many diets attempt to modify eating habits by inducing guilt feelings when a dieter is tempted to stray from a dieting regimen. For example, if a dieter is reminded of his or her overweight condition, there is less desire to indulge one's self by eating It is a known dieting technique to place a bathroom scale in front of food containers, such as refrigerators. The presence of the scale is a reminder of the dieter's overweight condition and this reminder will frequently diminish the dieter's desire to eat The placement of a scale in front of a food container and the practice of other similar dieting techniques generally have several drawbacks It is generally inconvenient and expensive to practice such dieting methods. The inconvenience of having a bathroom scale in front of a refrigerator is obvious Generally, it is not economically feasible to have a scale in the vicinity of all food containers such as refrigerators, breadboxes, kitchen cabinets, cookie jars, etc.

A further drawback with such conventional techniques is that it is relatively easy for the dieter to ignore the presence of the scale if the urge to eat becomes overwhelming.

SUMMARY OF THE INVENTION

The present invention is specifically directed to overcoming the above-enumerated problems in a novel and simple manner.

The present invention comprehends a method of psychologically reinforcing a dieting regimen, which method consists of the steps of providing a container defining a storage space with an opening for gaining access to the storage space, placing edible materials in the storage space, placing a movable closure over the container access opening in a closed position to prohibit access to the edible materials within the storage space through the container opening, with the closure being movable between the closed position and an open position wherein access can be gained through the container opening to the edible material in the storage space, and providing structure for clearly visibly indicating that the closure has been moved from its closed position to its open position.

Preferably, the indicating structure is chosen so that a visible sign remains that the closure has been moved to its open position, even if subsequently it is moved back to its closed position. This avoids "cheating" by the dieter.

While the indicating structure may take any of a variety of forms i.e. such as a light, buzzer, etc. preferably the indicating structure consists of a frangible element, such as a paper tape. Tape is attached to the container and the closure such that when the closure is moved from the closed position to the open position, the tape ruptures, thereby providing a visible symbolic indication to the dieter that the resolve not to overeat has been broken.

The tape is placed so that each time the closure is moved from its closed to its open position, the tape will rupture. Thus, it is impossible for the dieter to circumvent the tape.

The tape is a relatively inexpensive item and can be utilized on all types of containers. For example, it can be used on a door that is hinged on a refrigeration cabinet or on a lid associated with a cookie jar, and the like.

Preferably, a pressure sensitive adhesive is applied on one side of the tape to facilitate its attachment to the container and closure.

The invention also comprehends that a supply of the tape be provided, preferably in the form of a roll. The user can thus pay out and tear off a desired length of the tape.

The invention also comprehends an apparatus consisting of a container having a storage space for storing and preserving edible materials, an opening to gain access to the space, a closure movable between closed and open positions, and structure for clearly indicating that the closure has been moved from its closed position to its open position.

DETAILED DESCRIPTION OF THE DRAWINGS

Figure 1:
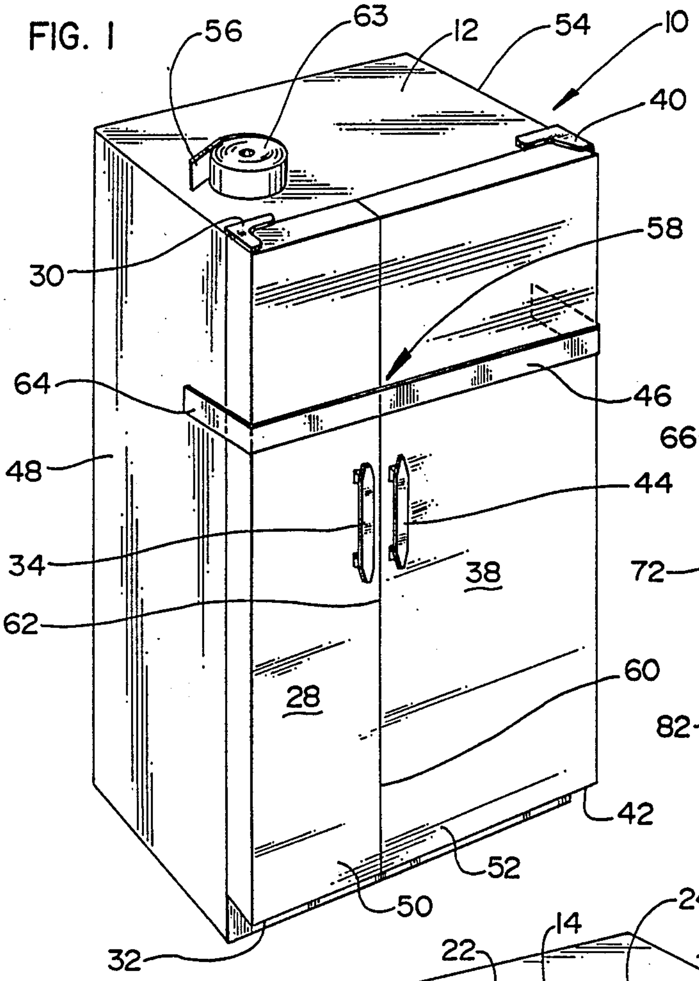
FIG. 1 is a perspective view of a refrigeration apparatus for food with a frangible tape extended around hinged closure doors according to the present invention.
Figure 2:
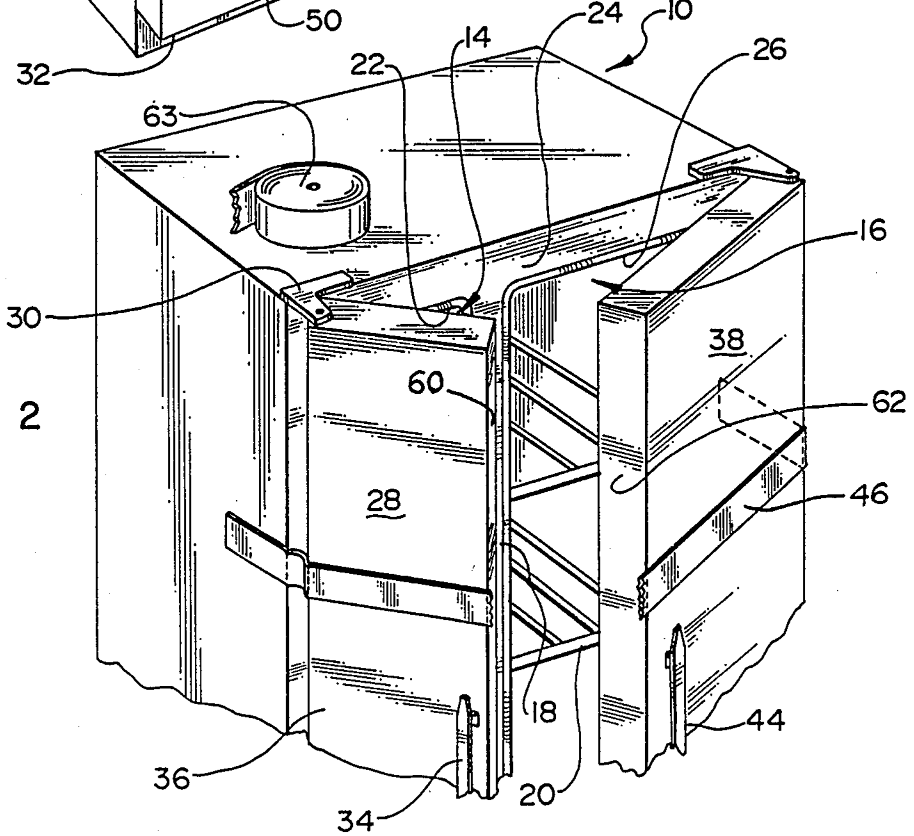
FIG. 2 is an enlarged, fragmentary, perspective view of the refrigeration apparatus with the closure doors open and showing the frangible tape ruptured.

In FIGS. 1 and 2, a conventional refrigeration apparatus is shown at 10. The refrigeration apparatus 10 is exemplary of numerous other types of food containers with which the present invention can be practiced. The refrigeration apparatus 10 consists of a squared, insulated cabinet 12 defining laterally spaced food storage spaces 14, 16 separated by a dividing wall 18. Both of the spaces 14, 16 are refrigerated and conventionally one of the spaces 14, 16 is maintained at temperatures above freezing and the other of the spaces 14, 16 is maintained at temperatures below freezing. A series of vertically spaced shelves 20 is provided in the spaces 14, 16 to support food items.

The space 14 has an opening 22 in the front wall 24 of the refrigeration apparatus 10 through which access can be gained to the space 14 to place food items in and remove food items from the space 14 and the shelves 20 therein. A similar opening 26 is provided to gain access to food storage space 16.

The opening 22 is selectively sealed by an insulated door 28 that is connected by hinge structure 30, 32, respectively at the top and bottom of the cabinet 12, to permit pivoting movement of the door about a vertical axis between the closed position in FIG. 1 and open position in FIG. 2. A handle 34 on the front wall 36 of the door 28 facilitates pivoting of the door 28 between its closed and open positions. A similar insulated door 38 selectively seals opening 26 and is connected to the cabinet 12 by hinged structure 40, 42, which permits pivoting movement of the door 38 about a vertical axis between the closed position in FIG. 1 and open position in FIG. 2. A handle 44 facilitates movement of the door 38 between its open and closed positions.

According to the invention, a length of flexible, frangible tape 46 is extended continuously around at least part of the cabinet periphery and is adhered to one of the laterally facing surfaces 48 of the cabinet 12, the front surfaces 50, 52 of the doors 28, 38 and a surface 54 facing laterally oppositely of the surface 48.

Preferably, the tape 46 is on the order of 2" in width. A pressure sensitive adhesive is provided on the side 56 of the tape 46 that contacts the cabinet 12 of the refrigeration apparatus 10. By applying the tape 46 in the described manner, the doors 28, 38 will be prohibited from opening by the tape 46 in the absence of a rupturing thereof. If the door 38 is opened by pulling on handle 44, the pressure applied through door 38 to the tape 46 will rupture the tape 46 at 58 where the free side edges 60, 62 of the doors 28, 38 are in close proximity with the doors 28, 38 in the FIG. 1 closed position. Rupture of the tape 46 will also occur both upon opening door 28 with door 38 closed and upon simultaneously opening doors 28 and 38.

Upon either or both of the doors 28 or 38 being opened, the tape 46 at the forward portion of the refrigeration apparatus 10 is drawn taut and stretched beyond its elastic limit whereupon it explosively ruptures. Preferably, the tape 46 is placed at the eye level of the dieter so that the rupture is clearly visible. This action rudely reminds the dieter that the resolve not to eat has been broken and serves as a psychological barrier to entering the refrigeration apparatus.

The tape is provided in a supply shown in FIGS. 1 and 2 as a continuous roll 63. The dieter can conveniently pay out a desired length of the tape 46, tear the tape 46 off and apply it to the outer surface of the cabinet 12 in the manner previously described. The tape 46 has an exposed surface 64, facing oppositely of the surface 56, that is brightly colored so as to clearly, visibly stand out against the outer surface of the cabinet 12. It is thus very difficult for the user to ignore the presence of the tape 46.

The tape 46 may be of the same general nature as the material manufactured by Minnesota Mining and Manufacturing to make pressure sensitive adhesive notes which it identifies with its trademark POST ITS TM. The adhesive used on the POST ITS TM is of sufficient strength to hold the tape 46 against the cabinet 12 to permit rupture upon the doors 28, 38 being opened, but does not leave a residue on the surface of the cabinet 12, nor does it affect the finish on the cabinet surface. The described type of tape and adhesive is only exemplary as any frangible material that will adhere with sufficient strength to allow rupture upon the doors 28, 38 being opened, would operate suitably.

The present invention has the advantage that the tape 46 is a relatively inexpensive item, yet is very effective for its intended purposes. Additionally, the tape is very versatile in that it can be used on any type of container having a closure movable between closed and open positions relative to the container.

Figure 3:
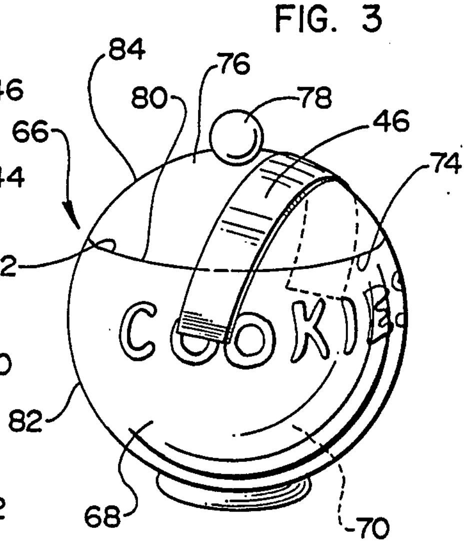
FIG. 3 is an elevation view of a cookie jar with a removable closure lid and a frangible tape placed over the jar and lid according to the present invention.

Another example of a container for storing and preserving edible items and with which the invention can be practiced is shown in FIG. 3. In FIG. 3, a cookie jar 66 is shown having a container 68 defining an internal storage space 70 for edible items such as cookies and the like. The container 68 has an upwardly facing edge 72 against which a downwardly facing edge 74 on a closure lid 76 nests. A knob 78 on the lid 76 can be readily grasped to move the lid 76 from the closed position in FIG. 3 away from the container 68 to an open position. In the open position, access can be gained to the space 70 through an upper opening 80 in the container 68.

According to the invention, a continuous strip of tape 46 is applied to the outer surfaces 82, 84 of the container 68 and closure 76, respectively. The tape 46 is adhered to the container 68, extended over and around the closure 76 and back against the container 68. The tape 46 prohibits separation of the closure 76 from the container 68 until rupture of the tape 46 occurs. Rupture of the tape 46 has the same psychological effect on the dieter as the rupture of the tape 46 extended around the previously described refrigeration apparatus 10.

It should be understood that numerous alternatives to the use of a frangible tape are contemplated by the invention. For example, a trigger can be provided on the closure to illuminate a light, sound a buzzer, or the like. Any structure that positively alerts the dieter that the resolve not to eat has been broken will generally induce sufficient guilt to modify eating habits. It is preferred that the indicating structure not be such that it can be disabled or reset upon simply replacing the closure in its closed position.

According to the invention, a simple, inexpensive, yet very effective method of psychologically reinforcing a dieting regimen is provided.

I claim:

1. A method of psychologically reinforcing a dieting regimen, said method comprising the steps of:

providing a container defining a storage space with an opening for gain access to the storage space;

placing edible materials in the storage space;

placing a movable closure over said container access opening in a closed position to prohibit access to the edible materials within said storage space through said container opening, said closure being movable from its closed position to an open position, wherein access can be gained through aid container opening to the edible material in the storage space by other than relative twisting between said closure and container, there being adjacent edges on the container and closure with the closure in its closed position; and adhering a frangible element to the edges on the container and closure so that the frangible element bridges a gap between the edges and is drawn taut and explosively ruptures as an incident of the closure being moved from its closed position to its open position, whereby a dieter is rudely reminded that the resolve not to eat has been broken, the tensile strength of the frangible element being chosen so that the frangible element does not significantly inhibit movement of said closure from its closed position to its open position.

2. The method of psychologically reinforcing a dieting regimen according to claim 1 wherein said frangible element is a one-time usable element.

3. The method of psychologically reinforcing a dieting regimen according to claim 1 wherein said container comprises a refrigeration apparatus and said closure comprises a hinged door.

4. The method of psychologically reinforcing a dieting regimen according to claim 1 wherein said container comprises a jar and the closure comprises a lid which is separable from the jar.

5. The method of psychologically reinforcing a dieting regimen according to claim 1 wherein said frangible element comprises a flexible tape with a pressure sensitive adhesive thereon.

6. The method of psychologically reinforcing a dieting regimen according to claim 5 including the steps of providing a supply of the tape and adhering less than the entire tape supply to the container and closure.

7. The method of psychologically reinforcing a dieting regimen according to claim 6 wherein the supply comprises a continuous roll of tape.

8. The method of psychologically reinforcing a dieting regimen according to claim 7 further including the step of replacing the frangible element after rupture thereof as an incident of the closure being moved from its closed position to its open position and back to its closed position.

9. The method of psychologically reinforcing a dieting regimen according to claim 5 wherein said tape is made from paper.

* * * * *